United States Patent
Ahmadloo

(10) Patent No.: US 9,373,011 B2
(45) Date of Patent: Jun. 21, 2016

(54) SYSTEM AND METHOD FOR IDENTIFICATION AND AUTHENTICATION OF PRECIOUS METALS AND SMALL JEWELRY ITEMS USING RADIO FREQUENCY IDENTIFICATION ("RFID") TECHNOLOGY

(71) Applicant: McMole Technologies Inc., Edmonton (CA)

(72) Inventor: Majid Ahmadloo, Edmonton (CA)

(73) Assignee: Mcmole Technologies, Inc. (CA)

( * ) Notice: Subject to any disclaimer, the term of this patent is extended or adjusted under 35 U.S.C. 154(b) by 21 days.

(21) Appl. No.: 14/243,148

(22) Filed: Apr. 2, 2014

(65) Prior Publication Data

US 2014/0292477 A1   Oct. 2, 2014

Related U.S. Application Data

(60) Provisional application No. 61/807,577, filed on Apr. 2, 2013.

(51) Int. Cl.
*G06K 7/10* (2006.01)
*G06K 19/077* (2006.01)

(52) U.S. Cl.
CPC ...... *G06K 7/10168* (2013.01); *G06K 19/07762* (2013.01); *G06K 19/07771* (2013.01)

(58) Field of Classification Search
CPC ................ G06K 7/10168; G06K 19/07762; G06K 19/07771; G06K 19/077; G06K 19/07758
See application file for complete search history.

(56) References Cited

U.S. PATENT DOCUMENTS

| | | | |
|---|---|---|---|
| 6,366,206 B1 * | 4/2002 | Ishikawa et al. | 340/573.1 |
| 6,897,827 B2 * | 5/2005 | Senba et al. | 343/873 |
| 8,310,367 B1 * | 11/2012 | Vishwanath | 340/572.1 |
| 8,444,058 B2 * | 5/2013 | Masin | 235/492 |
| 9,171,244 B2 * | 10/2015 | Endou | G06K 19/07754 |
| 2007/0199988 A1 * | 8/2007 | Labgold | G06Q 30/06 235/385 |
| 2008/0249899 A1 * | 10/2008 | Nasser | G06Q 10/087 705/28 |
| 2009/0188971 A1 * | 7/2009 | Chambon et al. | 235/375 |

FOREIGN PATENT DOCUMENTS

| | | | | |
|---|---|---|---|---|
| WO | WO 0049565 A1 * | 8/2000 | | G06K 19/04 |
| WO | WO 2012135346 A1 * | 10/2012 | | G01H 13/00 |

* cited by examiner

*Primary Examiner* — Brian Zimmerman
*Assistant Examiner* — Sara Samson
(74) *Attorney, Agent, or Firm* — Eric L. Sophir; Dentons US LLP

(57) ABSTRACT

A system and method is provided for the identification and authentication of precious metals and small jewelry. The system can include an embedded RFID tag, RFID tag reader and reader based unit (wired or wireless), and a basic tag information system for tag capture, look-up and display. The RFID tag can be embedded in absorbing dielectric medium inside epoxy in a tiny cavity placed in the metal or jewelry. A thin layer of epoxy placed over the tag can ensure that the tag will not be damaged from rubbing against skin, abrasion or chemicals while still allowing the desired electromagnetic properties (antenna and the circuitry performance). The RFID tag information can be transferred to a computer through the reader, and can be matched with preprogrammed information in a database.

20 Claims, 5 Drawing Sheets

SYSTEM AND METHOD FOR IDENTIFICATION AND AUTHENTICATION OF PRECIOUS METALS AND SMALL JEWELRY ITEMS USING RADIO FREQUENCY IDENTIFICATION ("RFID") TECHNOLOGY

CROSS-REFERENCE TO RELATED APPLICATIONS

This application claims priority of U.S. Provisional Patent Application Ser. No. 61/807,577 filed Apr. 2, 2013, which is incorporated by reference into this application in its entirety.

TECHNICAL FIELD

The present disclosure is related to the field of identification and authentication of precious metals, in particular, jewelry pieces by using embedded tiny RFID chips in order to provide unique identification code to be associated to a secure computer database which includes information about the origin of the material, owner, seller, etc.

BACKGROUND

Radio Frequency Identification ("RFID") is a method of uniquely identifying items using radio frequency waves between a tiny tag attached to an item and a tag reading device. As a very cost effective solution, RFID technology is used today in many applications, including security and access control, transportation and supply chain tracking. It is a technology that works well for assigning a unique identifier, and any associated relevant data to individual tagged items for tracking and counting purposes. RFID systems typically consist of two major components: readers and tags. The reader sends and receives Radio Frequency ("RF") data to and from the tag via small antennas. The tag is actually a microchip that stores data connected to an antenna to communicate with the reader. There are two major categories of RFID tags: battery powered active RFID Tags and passive RFID Tags. Unlike battery powered tags, passive RFID Tags use mutual electromagnetic coupling as the source of energy to communicate with the reader. Current passive RFID tag technologies can provide high data storage capacities in very small packages—enough capacity to include the required identification data within the chip yet small enough to be attached to a variety of minute objects including jewelry pieces and small industrial objects.

In order to meet a growing variety of application needs, RFID systems have been developed for different radio frequency bands: low frequency (125/134 KHz) used mostly for access control and asset tracking; mid-frequency (13.56 MHz) used for medium data rate and read ranges; and high-frequency (850-950 MHz and 2.4-2.5 GHz), which typically features high data transmission speeds and small label footprint and antenna suitable for small items. High frequency RFIDs are prone to electromagnetic shielding and reflection issues in the vicinity of metal structures. In order to use RFID chips on precious metal pieces, this issue has to be addressed. There are technical challenges of embedding such small RFID tags, which includes the generation of secondary disruptive electromagnetic fields due to the presence of Eddy currents in the surrounding metallic area.

Despite the wide range of RFID applications, this technology is not currently being used for permanent authentication and identification tags for jewelry items. Not very much technological change has happened in the jewelry stores industry in the last few decades. So far, the technological advancements in this retail sector include the introduction of electronic data interchange ("EDI") and the ongoing shift to internet sales. With regard to identification and authentication technologies, in spite of the huge costs to guard against unauthorized reproductions, there is no technology that can be considered as the standard in the industry. Authentication and Identification ("A&I") products and services have found new applications and revolutionized old ones in many fields. However, due to technical and business reasons, they have not yet penetrated the jewelry industry, despite a global market of over $200 billion annually, plus the pent-up demand for reliable, worry-free jewelry acquisition, ownership and disposal experience. The proposed technology will be specifically attractive for consumers interested in jewelry with no prior ownership history and to high net-worth consumers interested in A&I services for their jewelry portfolio for insurance, appraisal, estate management and other reasons. As in the case of blood diamonds, consumers are concerned about the source and origin of the material used in a piece of jewelry and its authentication. For example, a gold ring may be made from gold melted down from unethical sources, or sources with an undesirable history (e.g. from the gold teeth of ancient pirates, prisoners of war or victims of body part/metals harvesting). Similar to the case of the blood diamonds, consumers are willing to pay a premium price for a new and authenticated piece of jewelry manufactured using 'virgin' gold ethically extracted directly from a gold mine with no prior owners. A related market need is the identification and authentication of an existing jewelry portfolio of a consumer. This is of particular interest for high net-worth consumers who may own a large collection of jewelry as well.

There are technical difficulties of having efficient and unique identification and authentication method using RFID technology for precious metal objects such as jewelry pieces. These difficulties are due to electromagnetic interaction of the on-chip antenna on the RFID tag and surrounding metallic surface in the cavity housing the tag. Moreover, the cavity has to be as small as possible not to alter the artistic look of the jewelry piece. As a result, there is high interest at industrial and end consumer scales in overcoming these difficulties.

There are several viable technology approaches available, from hallmark stamps, to barcode/QR codes, to RFID tags as parts of a modern database and e-commerce system. These approaches differ in readiness, cost and ease of implementation, effectiveness, and ability to set up barriers to competition. However, as described in detail, RFID is the optimal ready-for-deployment technology choice for such applications. This opportunity did not exist earlier and its recent commercial maturity and low cost makes the technology highly market ready. The application of RFID tags (when appropriately packaged and embedded in the precious metallic objects as previously discussed) effectively attaches the unique tag of the RFID to the item. The unique tag cannot be copied or duplicated and no two tags will be the same. The unique tag can be read by the RFID reader and its tag identifier cross referenced by the system to a database which may contain information such as owner, creation date and history, authenticity of metal, and any other data fields determined useful.

It is, therefore, desirable to provide a system and method comprising RFID technology for identifying and authenticating metallic objects and jewelry pieces that overcome the shortcomings of the prior art.

SUMMARY

A system and method for identifying and authenticating jewelry pieces and metallic objects comprising RFID technology is provided. The proposed technique satisfies the market need to authenticate and identify metallic objects such as jewelry items, precious metals and industrial equipment. Currently, in spite of a demand from industry and consumers, precious metal objects such as jewelry do not typically have secure non-replicable form of unique identifier and therefore have no effective means of ensuring authenticity and identity. While there are several technological approaches (such as hallmarks) to achieving the unique identification, investigations indicates RFID tags are a preferred approach as other techniques are relatively easy to replicate. In fact, their recent commercial and technological maturity and low cost open up this opportunity at this time that did not exist earlier. The application of RFID tags (when appropriated packaged and embedded in the precious metal object) effectively attaches the unique tag of the RFID to the precious metal object. The unique tag cannot be copied or duplicated and no two tags will be the same. The unique tag can be read by the RFID reader using a specially designed probe to reach inside the ring and curved areas, and its tag identifier can be cross-referenced by the system to a database, which can contain necessary information such as owner, creation date and history, authenticity of metal, and any other data fields determined useful by the jeweler, owner or the authorized dealer. For example, the value of a piece of jewelry is typically much more than the value of the precious metal that it is made of. There are additional tangible values such as the design and the artistic value of the jewelry item, as well as intangible values such as its history or chain of ownership (e.g. Princess Diana's engagement ring or one that is passed down a family for generations). One of the most promising features of this approach is the possibility of prepackaging the RFID tag to ensure dimensional depth and spacing of the tag in the cavity relative to the metal in its proximity and to use highly durable epoxy, to fill the cavity, affix the tag, provide protection and make it impossible to remove the tag without destroying it. The tag can be designed in a way that it will not survive melt down of the metal item or any other form of attempted removal, reuse or tampering. In case of necessity, such as the need for size adjustments in the jewelry pieces, an authorized person can verify the old tag, replace it with the new RFID package and update the associated information in the data base.

This identification and authentication technique for precious metals and jewelry items can use tiny RFID tags mounted in a cavity in the precious metal object. Most other applications of RFID tags attempt to maximize the distance from which the tag can be read but in this application, it is desirable to limit the range of tag reading to very close proximity for security and privacy reasons, so that unauthorized reading attempts will not be successful. This can result in a different set of limitations and opportunities such as the tag can be very tiny, and electromagnetic field effects from tag embedding in metals can be tolerated to a greater extent with the application of proper packaging. Simulations and the developed prototype have verified that tags attached to a tag package (which ensures dimensional spacing of the tag within the cavity) with electromagnetic absorbing dielectric medium inside epoxy (which may be colored to match the color of the precious metal or other marketing purposes) in a tiny cavity (which may be machined or laser drilled) can produce the desired electromagnetic characteristics for close proximity reading solutions. A thin layer of epoxy (super-epoxies exist which are harder than the precious metal itself) above the tag ensures the tag will not be damaged from rubbing against skin, abrasion or chemicals while still allowing the desired electromagnetic properties (antenna performance and the mutual tag-reader communication link quality). In this process, the small RFID chip can be embedded into the electromagnetic ("EM") absorbing material (on-chip antenna facing outwards), the cavity walls within the precious metal will be covered with adhesive epoxy resin, RFID chip and its surrounding absorber will be placed inside the resin coated cavity and finally the exposed side will be covered by a thin layer of resin epoxy to form a package within the cavity created in the precious metal. Pre-packing can also be done using UV curable epoxies. The innovation is not in the RFID tag technology itself (which is commercially available and inexpensive), but in the details of selecting the tag with desired specifications, and the packaging and mounting without disturbing the artistic look and appearance of the jewelry piece, as well as the specially designed reading probe which enable this unique application to work with a high level of reliability as well as ease of installation by qualified goldsmiths and craftsmen. The innovation is also in the surrounding subsystems including readers, database, etc. which can be done in a wired or wireless configurations.

In some embodiments, the system comprise a special reader probe to reach the RFID tag planted at hard to reach interior parts of the rings, curved surfaces of jewelry items or cavities in the metallic pieces. The design of this probe can be based on the application of the chip inductor antennas to shrink the probe size and make it as small as possible in order to access such hard to reach spots which are not accessible by conventional RFID reader antennas. This design can also provide a high quality factor filtering mechanism to specifically allow the energy coupling between the reader and the tag at the defined communication frequency. This probe can be connected to the RFID reader and computer in a wired or wireless configuration based on the design requirements.

In some embodiments, the system can comprise new designs including tag antennas and reader antennas for extended range application of this methodology.

In some embodiments, the system can further comprise portable devices such as smart phones and tablets to be connected to the RFID reader for data exchange, data processing and secure data swapping over the data cloud, accessible for any authorized person.

Broadly stated, in some embodiments, a system can be provided for the identification and authentication of items of precious metal or jewelry, the system comprising: a radio frequency identification ("RFID") chip packaged within dielectric absorbing material and configured to be placed in a cavity disposed in an item of precious metal or jewelry, the RFID chip further comprising a unique identifier for the item; an RFID reader configured to operatively communicate with the RFID chip and retrieve or read the unique identifier, the RFID reader further configured to operatively communicate with a personal computer; and a database operatively disposed in the personal computer, the database configured to store the unique identifier and to associate the unique identifier with data associated with the item.

Broadly stated, in some embodiments, the system can comprise resin for covering the RFID chip in the cavity of the item.

Broadly stated, in some embodiments, the RFID reader can further comprise a probe configured for reading the unique identifier and communicating the unique identifier to the personal computer.

Broadly stated, in some embodiments, the probe can further comprise a wireless radio frequency transmitter configured for transmitting the unique identifier to the personal computer.

Broadly stated, in some embodiments, the data can comprise one or more of a group consisting of identification of type of item, country of origin of item, date of manufacturing of item, pedigree of item, inventory of features of item, value of item, history of repairs or alterations to item, current owner of item, previous owner or owners of item and records relating to transfer of ownership of item.

Broadly stated, in some embodiments, a method can be provided for the identification and authentication of items of precious metals or jewellery, the system comprising, the method comprising the steps of: providing a system comprising: a radio frequency identification ("RFID") chip packaged within dielectric absorbing material and configured to be placed in a cavity disposed in an item of precious metal or jewellery, the RFID chip further comprising a unique identifier for the item, an RFID reader configured to operatively communicate with the RFID chip and retrieve or read the unique identifier, the RFID reader further configured to operatively communicate with a personal computer, and a database operatively disposed in the personal computer, the database configured to store the unique identifier and to associate the unique identifier with data associated with the item; placing or installing the RFID chip into the cavity; reading the unique identifier with the RFID reader; storing the unique identifier in the database; and inputting the data into the database and associating the data with the unique identifier.

Broadly stated, in some embodiments, the method can further comprise the step of covering the RFID chip disposed in the cavity of the item with resin.

DETAILED DESCRIPTION OF EMBODIMENTS

Figure 1:
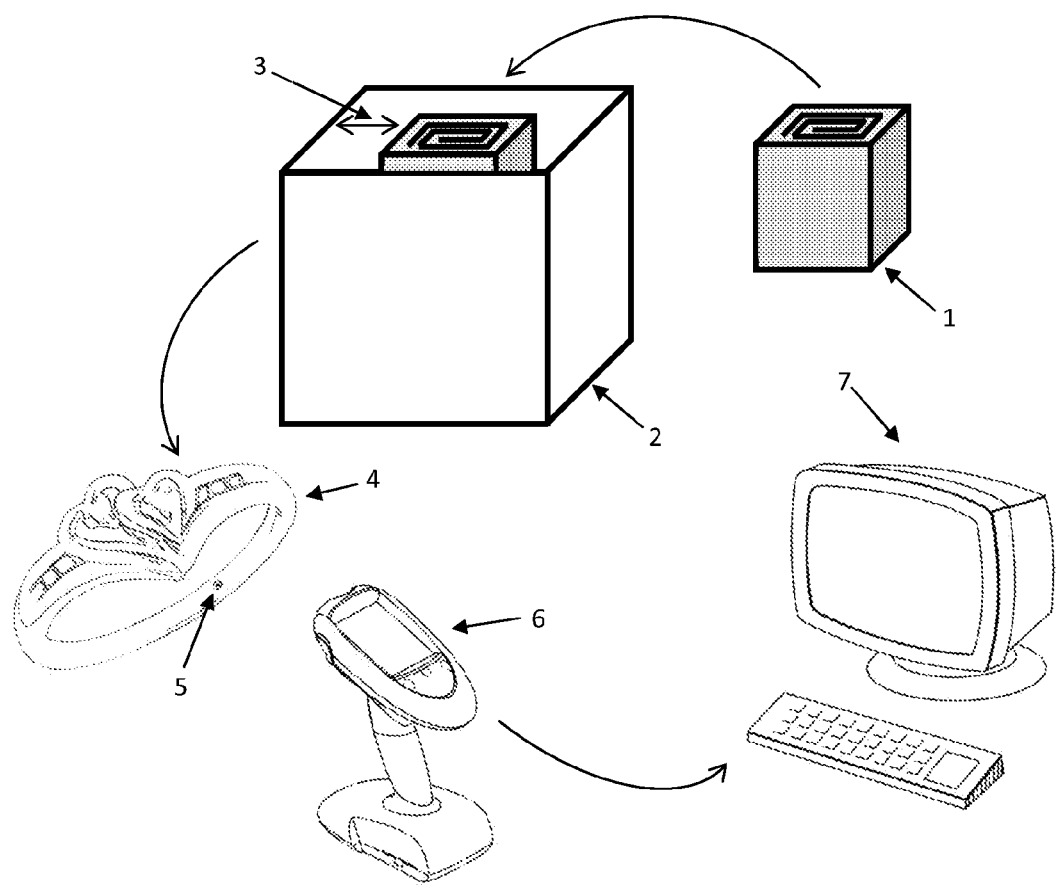
FIG. 1 is a block diagram depicting one embodiment of a system for identifying and authentication of precious metals and small jewelry.

Referring to FIG. 1, one embodiment of a system comprising RFID technology in the identification and authentication of jewelry and precious metal items is shown. An RFID tag can be implanted in the jewelry item and a RFID reader can be used to read and transfer the data to a computer (in a wired or wireless configuration), and a data management system for further processing of the data. The unique tag cannot be copied or duplicated and no two tags will be the same. The unique tag can be read by the RFID reader and its tag identifier cross-referenced by the system to a database which may contain information such as owner, creation date and history, authenticity of metal, and any other data fields deemed useful.

Figure 3A:
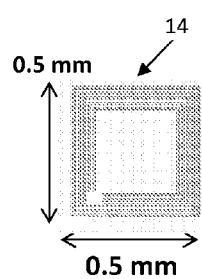
FIG. 3A is a first X-Y graph depicting $Z_{11}$ impedance versus frequency for the RFID chip of FIG. 2A without packaging providing proper spacing required for electromagnetic disturbed free tag package.
Figure 3A:
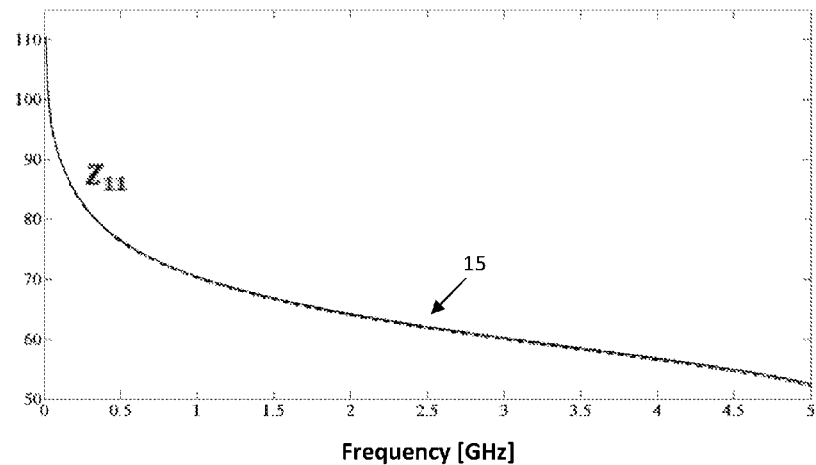
Figure 3B:
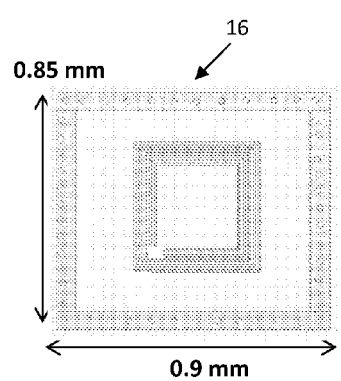
FIG. 3B is a second X-Y graph depicting $Z_{22}$ impedance versus frequency for the RFID chip of FIG. 2A with packaging providing proper spacing required for electromagnetic disturbed free tag package.
Figure 3B:
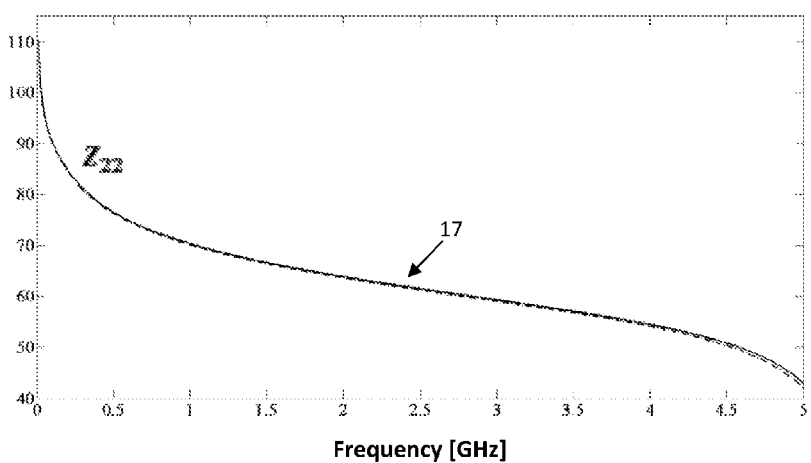

Due to the electromagnetic considerations, and to properly isolate the tag from the surrounding metallic environment, especially in small items, RFID technology in the identification and authentication of jewelry pieces has not been previously been implement yet and in order to do so, a proper chip size and packaging is required. Beside the electromagnetic considerations, applying such identification techniques should not damage or alter the appearance of the jewelry piece. In typical RFID attaching techniques, a tag can be attached to the jewelry item by adhesives, wire or band, which can easily be cut or separated from the jewelry piece. Unless RFIDs can be permanently embedded in the jewelry piece, the utility of RFID for identification and authentication purposes of jewelry items cannot be fully realized. The proposed solution to use RFID technology in metallic jewelry pieces, as described herein, is to use a small epoxy resin based package for an RFID tag, and covering the entire RFID tag and antenna. This package not only provides mechanical protection especially during the tag mounting process but also gives enough separation between the chip antenna and surrounding metal to guarantee disturbed-free electromagnetic performance of the tag. The package can also be small enough not to disrupt the appearance of the jewelry item. In order to prove the proper performance of such RFID chip tags and packages embedded in metallic bodies, electromagnetic simulations were performed. Impedance parameters are the key factor to determine if the tag will remain functional at the desired working frequency when the tag is surrounded by metallic surfaces. The plots in FIGS. 3A and 3B show full-wave electromagnetic modeling of impedance parameters of the RFID inductor antenna in free space and the same antenna in the package embedded in a metallic body. Results show that impedance parameters of the inductor antenna remain intact by properly spacing the tag from the surrounding metal i.e. using proper packaging. The device under study in these simulations is 0.5 mm×0.5 mm inductor antenna without packaging (FIG. 3A) and antenna packed within 0.9 mm×0.8 mm×0.5 mm epoxy resin based package (dielectric constant about 3.5) surrounded by metal (FIG. 3B). Almost identical graphs for these two cases prove the feasibility of using small RFID chips in metallic items using appropriate resin base packaging including proper shape, dimensions and material. Due to the very small antenna size and the resulting relatively low electromagnetic energy coupling between the tag and interrogating reader probe, reading distances for such RFID tags are very short. This can significantly reduce the risk of random scanners accidentally or maliciously accessing and reading the tag. This is an important feature of this embodiment which allows only authorized people to gain access to the tag using a proper tag reading setup and so reduces the risk of invasion.

Referring to FIG. 1, in some embodiments, small RFID tag 1 can be embedded in the carbon based absorbing material and packaging enclosure 2 with proper spacing 3, wherein the package can be embedded in the jewelry item 4. The embedded package will not alter the appearance of the jewelry piece due to its small size 5. RFID reader 6 can capture unique data and transmits to computer unit 7 for further processing. In some embodiments, the acquired data can be displayed, incorporated in data bases and data processing, and securely accessed from the web.

Figure 2A:
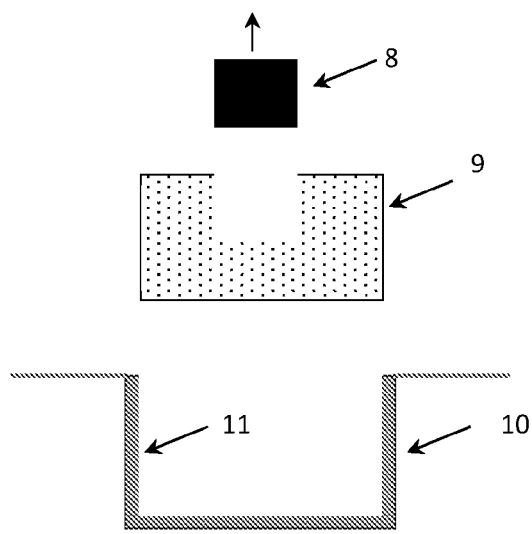
FIG. 2A is an exploded side view depicting the packaging and embedding an RFID chip into a metallic item or jewelry piece in accordance with the system of FIG. 1.
Figure 2B:
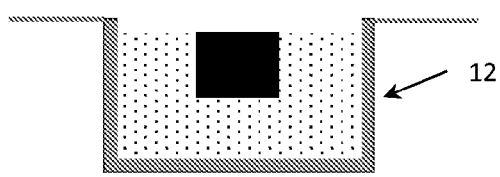
FIG. 2B is a side view depicting the RFID chip installed in the cavity of FIG. 2A.
Figure 2C:
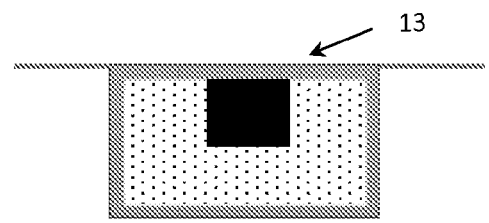
FIG. 2C is a side view depicting the installed RFID chip of FIG. 2B covered with a layer of resin epoxy.

In some embodiments, referring to FIGS. 2A, 2B and 2C, small RFID chip 8 can be embedded into carbon-based electromagnetic ("EM") absorbing material 9 with the on-chip antenna of RFID chip 8 facing outwards, covering the walls of cavity 10 within the precious metal with adhesive 11, placing RFID chip 8 and its surrounding absorbing material 9 inside resin-coated cavity 12 and finally covering the exposed side by a thin layer of resin epoxy 13 to form a package within cavity 10 created in the precious metal.

Shown in FIGS. 3A and 3B, impedance ($Z_{11}$ and $Z_{22}$ parameters) plots of 0.5 mm×0.5 mm inductor antenna 14 without packaging (FIG. 3A), and antenna 14, in a 0.9 mm×0.85 mm×0.5 mm resin based packaging surrounded by metal 16. These plots are simulations using Ansoft Designer® EM simulation software. Solid lines in 15 and 17 shows the results related to inductor antenna 14 without packaging, and the dashed lines are results of on-chip antenna 14 with the packaging. As the graphs shows, proper packaging will not change the parameters of the on-chip inductor antenna, which is essential for the proper communication between the reader and tag.

Figure 4A:
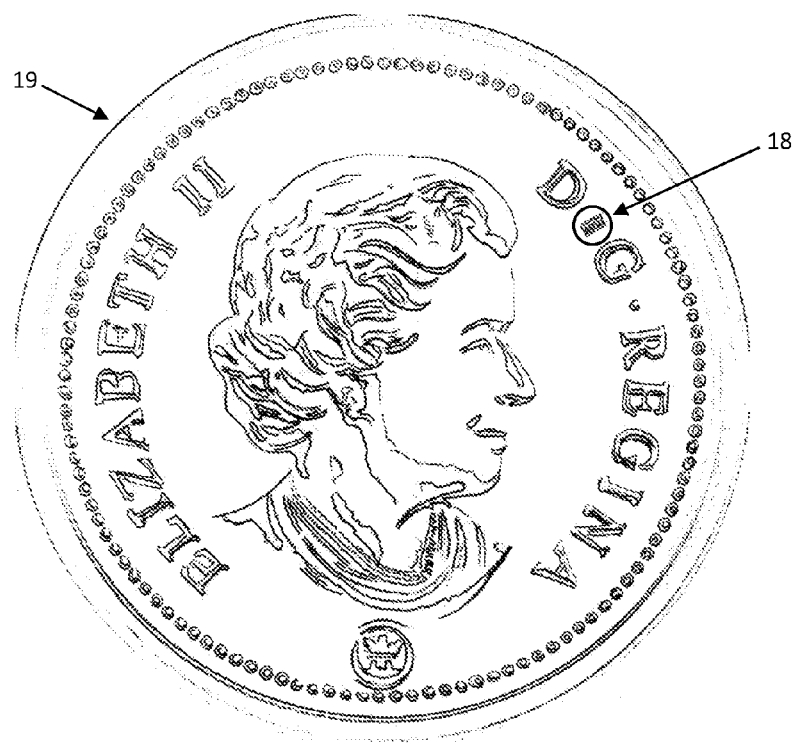
FIG. 4A is a top plan view depicting a coin with an RFID chip of FIG. 2A embedded thereon.
Figure 4B:
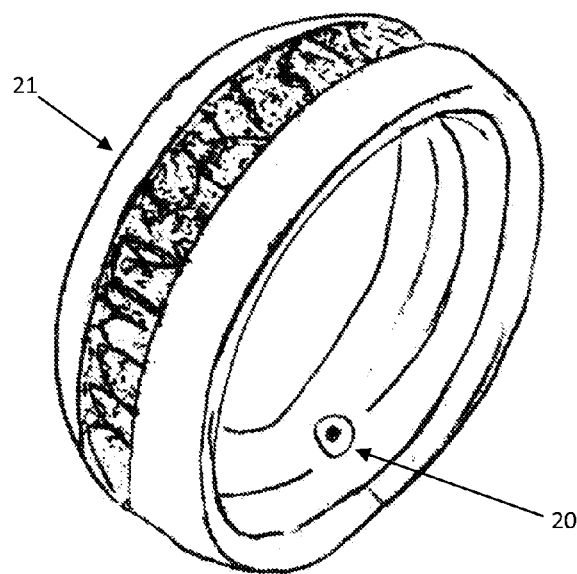
FIG. 4B is a perspective view depicting an RFID tag packaged and embedded inside of a jewelry ring.

Referring to FIG. 4A, small RFID chip 18 is shown embedded inside a cavity drilled in coin 19. Referring to FIG. 4B, packaged RFID chip 20 is shown embedded inside jewelry ring 21. Based on the RFID chip specifications, the structure of the cavity and the materials of the packaging have to be modified. As it is shown in these figures, embedding the chip does not disturb the appearance of the object. A thin layer of epoxy on top of the chip guarantees the durability of the chip inside the cavity without affecting radio wave interactions between chip and reader.

Figure 5A:
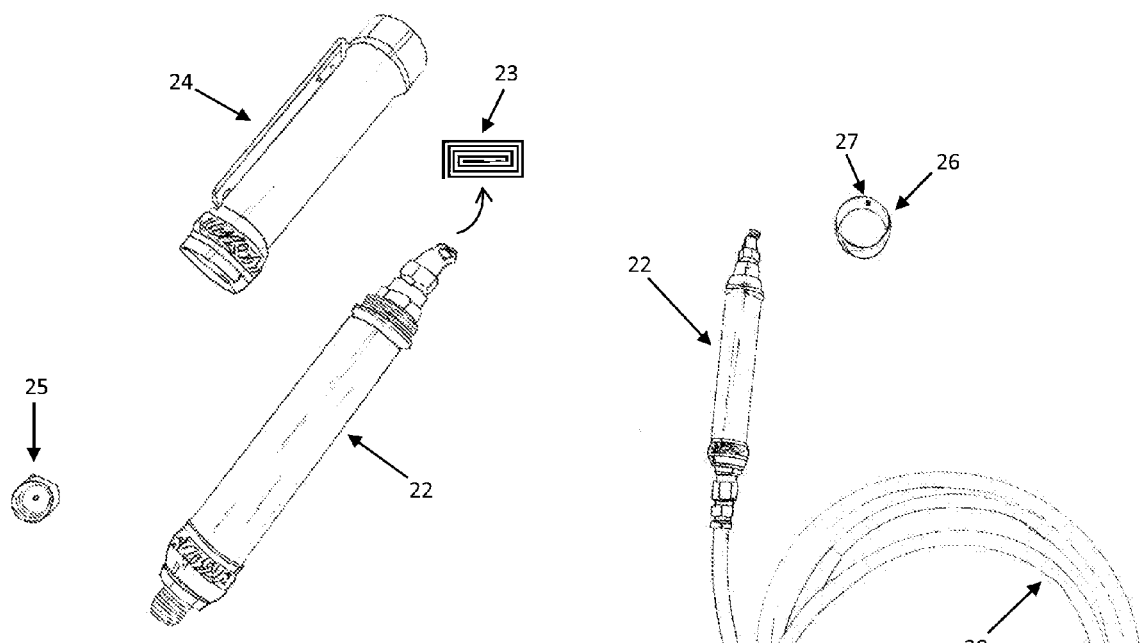
FIG. 5A is a perspective view depicting a probe for use in reading an RFID chip embedded in a metallic object or piece of jewelry.
Figure 5B:
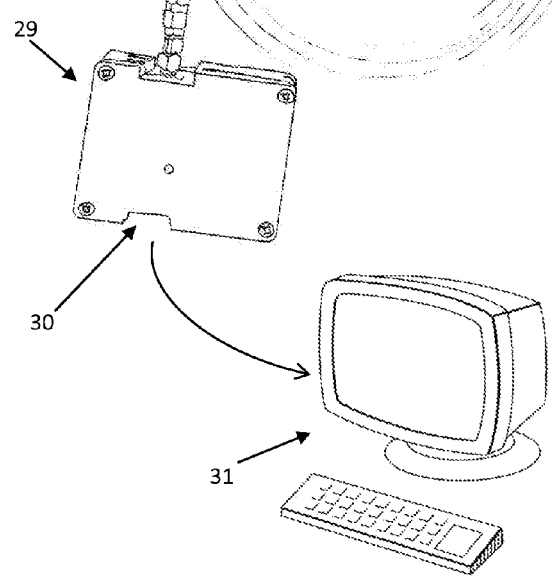
FIG. 5B is a block diagram depicting one embodiment of a system including the reading probe of FIG. 5A with RF cable connection to the RFID reader for identifying and authentication of a metallic object or piece of jewelry.

Referring to FIGS. 5A and 5B, one embodiment of an RFID reader and a developed reader probe is shown. In some embodiments, probe 22 can comprise inductor antenna 23, which can be designed to perform at an RFID communication frequency (about 900 MHz in this case). Cap 24 and port terminator 25 can protect probe 22 when not in use. Probe 22 can be placed at the vicinity of packaged RFID tag 27 inside ring 26. The information of the scanned tag can be transferred to RFID reader unit 29 through RF cable 28. Then the code read from RFID tag 27 can be communicated to computer unit 31 through USB port 30 on reader unit 29 for further processing and data-basing on computer unit 31. In some embodiments, reader unit 29 and probe 22 can be integrated and communicate wirelessly with computer 31 using Bluetooth or other wireless communication protocols and technologies, and so remove the need for any communication cables and further ease the application of the system on jewelry pieces or small metallic objects.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

I claim:

1. A system for the identification and authentication of items of precious metal or jewelry, the system comprising:

a) a radio frequency identification ("RFID") chip comprising an outward facing surface and an on-chip antenna disposed thereon, the RFID chip further comprising electromagnetic absorbing material disposed therearound except on the outward facing surface, the combination of the RFID chip and the electromagnetic absorbing material configured to be placed in a cavity comprising metallic surfaces disposed in an item of precious metal or jewelry with the outward facing surface facing away from the cavity whereby the electromagnetic absorbing material isolates the RFID chip from disruptive electromagnetic fields due to the presence of eddy currents in the metallic surfaces of the cavity, the RFID chip further comprising a unique identifier for the item;
   b) an RFID reader configured to operatively communicate with the RFID chip and retrieve or read the unique identifier, the RFID reader further configured to operatively communicate with a personal computer; and
   c) a database operatively disposed in the personal computer, the database configured to store the unique identifier and to associate the unique identifier with data associated with the item.

2. The system as set forth in claim 1, further comprising resin for covering the outward facing surface of the RFID chip in the cavity of the item.

3. The system as set forth in claim 1, wherein the RFID reader further comprises a probe configured for reading the unique identifier and communicating the unique identifier to the personal computer.

4. The system as set forth in claim 3, wherein the probe further comprises a wireless radio frequency transmitter configured for transmitting the unique identifier to the personal computer.

5. The system as set forth in claim 1, wherein the data comprises one or more of a group consisting of identification of type of item, country of origin of item, date of manufacture of item, pedigree of item, inventory of features of item, value of item, history of repairs or alterations to item, current owner of item, previous owner or owners of item and records relating to transfer of ownership of item.

6. A method for the identification and authentication of items of precious metals or jewellery, the system comprising, the method comprising the steps of:

a) providing a system comprising:
      i) a radio frequency identification ("RFID") chip comprising an outward facing surface and an on-chip antenna disposed thereon, the RFID chip further comprising electromagnetic absorbing material disposed therearound except on the outward facing surface, the combination of the RFID chip and the electromagnetic absorbing material configured to be placed in a cavity comprising metallic surfaces disposed in an item of precious metal or jewelry with the outward facing surface facing away from the cavity whereby the electromagnetic absorbing material isolates the RFID chip from disruptive electromagnetic fields due to the presence of eddy currents in the metallic surfaces of the cavity, the RFID chip further comprising a unique identifier for the item,
      ii) an RFID reader configured to operatively communicate with the RFID chip and retrieve or read the unique identifier, the RFID reader further configured to operatively communicate with a personal computer, and
      iii) a database operatively disposed in the personal computer, the database configured to store the unique identifier and to associate the unique identifier with data associated with the item;
b) placing or installing the RFID chip into the cavity;
c) reading the unique identifier with the RFID reader;
d) storing the unique identifier in the database; and
e) inputting the data into the database and associating the data with the unique identifier.

7. The method as set forth in claim 6, further comprising the step of covering the outward facing surface with resin.

8. The method as set forth in claim 6, wherein the RFID reader further comprises a probe configured for reading the unique identifier and communicating the unique identifier to the personal computer.

9. The method as set forth in claim 8, wherein the probe further comprises a wireless radio frequency transmitter configured for transmitting the unique identifier to the personal computer.

10. The method as set forth in claim 6, wherein the data comprises one or more of a group consisting of identification of type of item, country of origin of item, date of manufacture of item, pedigree of item, inventory of features of item, value of item, history of repairs or alterations to item, current owner of item, previous owner or owners of item and records relating to transfer of ownership of item.

11. The system as set forth in claim 1, wherein the cavity comprises a volume of less than 0.5 cubic millimeters.

12. The method as set forth in claim 6, wherein the cavity comprises a volume of less than 0.5 cubic millimeters.

13. The system as set forth in claim 1, wherein the RFID chip and the RFID reader are configured to operate at a high-frequency RFID radio frequency band.

14. The system as set forth in claim 13, wherein the high-frequency RFID radio frequency band is in a frequency range of 850 to 950 megahertz.

15. The method as set forth in claim 6, wherein the RFID chip and the RFID reader are configured to operate at a high-frequency RFID radio frequency band.

16. The method as set forth in claim 15, wherein the high-frequency RFID radio frequency band is in a frequency range of 850 to 950 megahertz.

17. The system as set forth in claim 1, wherein the electromagnetic absorbing material comprises carbon-based electromagnetic absorbing material.

18. The method as set forth in claim 6, wherein the electromagnetic absorbing material comprises carbon-based electromagnetic absorbing material.

19. The system as set forth in claim 2, wherein the resin comprises a dielectric constant of about 3.5.

20. The method as set forth in claim 7, wherein the resin comprises a dielectric constant of about 3.5.

* * * * *